Nov. 27, 1956     I. EIDE     2,772,111
BALE HOOK
Filed April 13, 1953
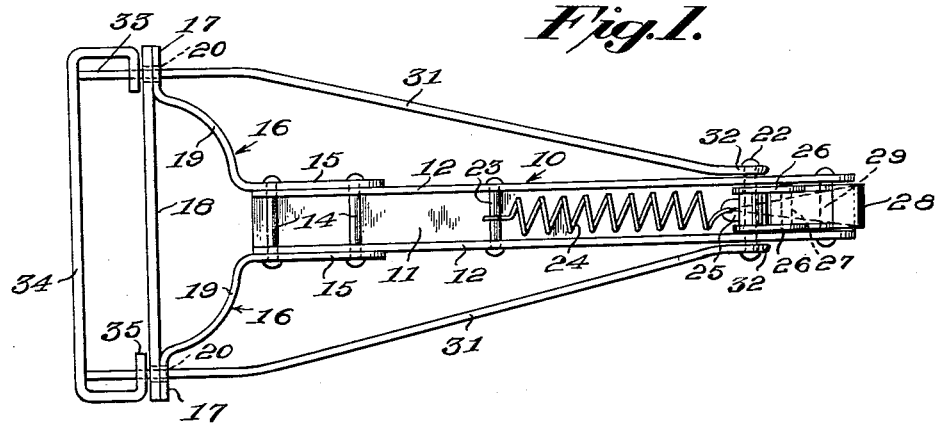
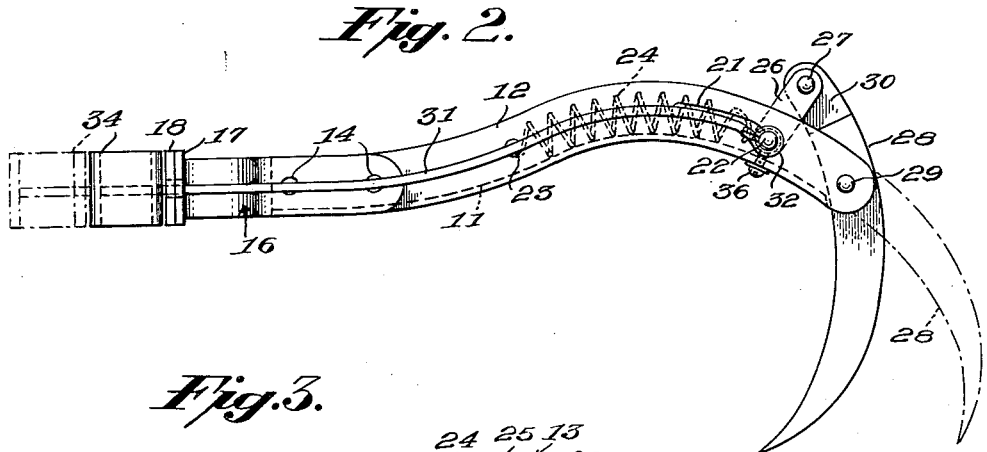
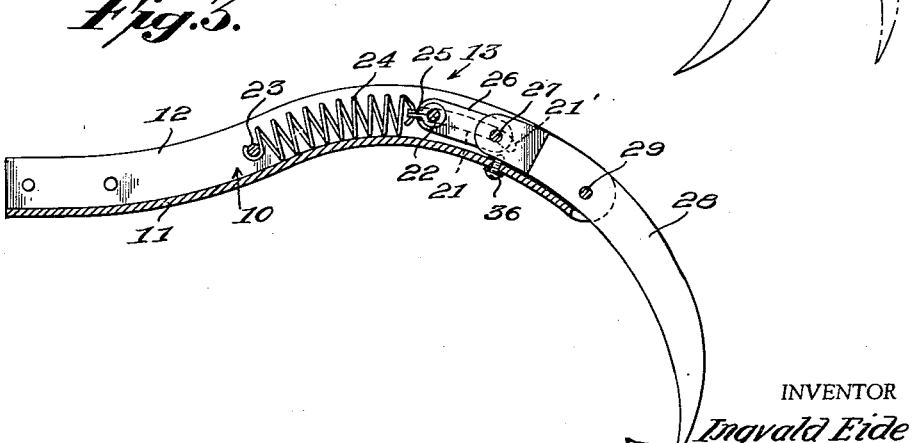
INVENTOR
*Ingvald Eide*
BY
ATTORNEY United States Patent Office 2,772,111
Patented Nov. 27, 1956

2,772,111
BALE HOOK

Ingvald Eide, Colton, S. Dak.

Application April 13, 1953, Serial No. 348,364

5 Claims. (Cl. 294—26)

This invention relates to a bale hook.

The invention is more particularly concerned with a hand operable hook structure for the handling of bales of hay or the like and a primary object is to provide a bale engageable hook which is automatically operative upon tightening the grip in lifting a bale of hay to move the hook to bale penetrating position and upon loosening the grip to retract the hook to a normal or bale release position.

A further object of the invention is to provide a bale hook structure including an elongated frame and a hook pivotally supported by the frame adjacent one end thereof and wherein the frame is arched in a direction away from the point of the hook in its operative position whereby the hook is adapted to penetrate a bale a substantial distance from the side thereof traversed by the frame.

Other objects and advantages of the invention will become apparent in the course of the following detailed description, taken in connection with the accompanying drawing, wherein—

Fig. 1 is a top plan view of the improved hook structure with the hook element in operative bale penetrating position.

Fig. 2 is a side elevational view of the hook structure of Fig. 1 and further showing the hook element in retracted non-operative position in dotted lines.

Fig. 3 is a longitudinal vertical section of the frame channel member and showing the hook element in retracted position.

Referring now in detail to the drawing, 10 designates a frame channel member including a bottom wall 11 and opposite side walls 12.

The said channel member as is more clearly indicated in Fig. 3 is of generally ogee form and includes an upwardly curved or arched portion 13 for receiving the corner of a bale within the concave portion of the bottom wall 11 whereby the hook element later described will penetrate the bale at a point substantially below the said corner.

One end of the channel member 10 has secured thereto as by long rivets 14, legs 15 of a pair of brackets 16 having additional legs 17 at right angles to legs 15 and in rearwardly spaced relation thereto.

The legs 17 are rigidly secured to a finger grip bar 18 and the portions 19 of brackets 16 intermediate the legs 15 and 17 are curved forwardly away from the grip bar 18 providing a finger receiving space. The legs 17 and adjacent ends of bar 18 are provided with apertures 20 for a purpose later to appear.

The side walls 12 of the channel member 10 are provided with longitudinally extending laterally aligned slots 21 in which is loosely disposed a rivet member 22 disposed transversely of the channel member.

A further rivet member 23 extends transversely through the side walls 12 of the channel member intermediate the rivet members 14 and the slots 21.

A coil spring 24 is disposed within the channel member 10 and has one end thereof secured to rivet member 23 and the opposite end thereof is secured to a clip member 25 rotatably supported on the rivet member 22 whereby the spring normally urges the rivet member 22 toward the rear ends of slots 21 as is clearly shown in Fig. 3.

At this point it is to be observed that the forward ends of the slots 21 are downwardly curved as at $21^1$ for a purpose later to appear.

A pair of links 26 have corresponding ends thereof pivotally supported on the rivet member 22 adjacent the side walls 12 and the opposite ends of the links are pivotally connected at 27 to the butt end of a hook element 28 which is pivotally connected intermediate its ends to the side walls 12 adjacent the forward ends thereof as indicated at 29. The hook element 28 is recessed inwardly at 30 adjacent its butt end to accommodate the adjacent ends of links 26 and the hook element tapers toward its opposite point end as is indicated in dotted lines in Fig. 1.

A hook element operating frame member is provided and which is longitudinally movable relative to the frame channel member 10. Said frame member comprises a pair of rods 31 which are curved in conformity to the frame channel member 10 and which extend on opposite sides of the said channel member.

The forward ends 32 of rods 31 have pivotal connections with rivet member 22, the rods thence diverge rearwardly and merge into straight parallel portions 33 which extend loosely through the apertures 20 and whose rear ends are rigidly connected to a hand gripping bar 34 which is spaced from bar 18 and which includes inwardly directed flanges 35 for maintaining such spaced relation.

The rivet member 22 is disposed within the downwardly curved portions $21^1$ of the slots 21 in the operative position of the hook element 28 as in Fig. 2 and since the line of pull by spring 24 is substantially below the axis thereof, the spring may not readily retract the hook element if rivet member 22 be in the forward bottom ends of the slots. Accordingly, means is provided to adjust the position of the rivet member and same preferably comprises a screw 36 threaded through the base 11 of the channel member and engageable with the clip 25.

Having described the structure of the improved hook, the operation thereof is as follows:

The hook structure is normally in the position indicated by dotted lines in Fig. 2 wherein the spring 24 has moved rivet member 22 toward the rear ends of slots 21.

When it is desired to handle bales, an operator grasps the bars 18 and 34 and naturally grips same whereby they approach each other and assume the position shown in Fig. 1 and in full lines in Fig. 2 whereby rivet member 22 is moved to the forward ends of slots 21 with a resulting movement of hook element 28 from the inoperative dotted position to the full line operative position in Fig. 2.

Upon release of the bale an operator naturally releases the grip bars 18 and 34 whereupon the spring 24 moves the hook element 28 to its inoperative position.

Having set forth my invention in accordance with a single structural embodiment thereof, what I claim and desire to secure by U. S. Letters Patent is:

1. A bale hook structure comprising an elongated frame member, a hook element pivotally secured intermediate its ends to said frame member adjacent one end thereof, a second frame member longitudinally movable relative to said first frame member, link connections between said second frame member and the butt end of said hook element, and adjacent hand grip bars on the ends of said frame members removed from the pivoted hook element, said second frame member controlling the position of the pivoted hook element.

2. The structure according to claim 1, together with spring means interconnecting said frame members and operative to move same in relatively opposite directions for moving said hook element to an inoperative position.

3. The structure according to claim 1, wherein said frame members are upwardly arched at the end of said frame members adjacent the pivoted hook element.

4. A bale hook structure comprising an elongated frame channel member having an upwardly arched forward end portion, a finger grip bar rigidly supported by the end of said channel member opposite said upwardly arched forward end portion, laterally aligned longitudinally elongated slots in the side walls of said channel member in the arched end portion thereof, a rivet member disposed transversely of said channel member and having its opposite ends projecting freely through said slots, a tension spring disposed within the channel member having one end thereof anchored in the channel member and the other end thereof engaged with said rivet member, a hook element pivotally connected intermediate its ends to the forward ends of the side walls of said channel member, a pair of links having corresponding ends thereof pivotally engaged with said rivet member and the opposite ends thereof pivotally connected to the butt end of said hook element, a pair of rods on opposite sides of said channel member having their forward ends pivotally engaged with opposite ends of said rivet member, said rods extending through said finger grip bar and a hand grip bar secured to the opposite ends of said rods in laterally opposed relation to said finger grip bar, the position of the finger grip bar controlling the position of the hook element.

5. The structure according to claim 4, wherein said hook element in its normal retracted position lies in the general curve of said arched forward end portion of said frame channel member.

References Cited in the file of this patent
UNITED STATES PATENTS

| | | |
|---|---|---|
| 1,180,196 | Schepp | Apr. 18, 1916 |
| 2,628,857 | Nelson | Feb. 17, 1953 |